United States Patent [19]

Krush et al.

[11] Patent Number: 5,727,835
[45] Date of Patent: Mar. 17, 1998

[54] ALARMED TRUCK MOUNTED TOOL BOX

[75] Inventors: Paul R. Krush, New Berlin, Wis.; F. William Dyer, II, Johnson City, Tenn.

[73] Assignee: Douglas Dynamics, L.L.C., Milwaukee, Wis.

[21] Appl. No.: 636,487

[22] Filed: Apr. 23, 1996

[51] Int. Cl.$^6$ ............... B60R 11/06; B60R 25/00
[52] U.S. Cl. ............... 296/37.6; 224/539; 224/404; 340/426
[58] Field of Search ............... 296/37.6, 100; 224/539, 543, 400, 402, 403, 404; 340/425.5, 426; 307/10.2

[56] References Cited

U.S. PATENT DOCUMENTS

| | | | |
|---|---|---|---|
| 3,640,423 | 2/1972 | Parker et al. | 296/37.6 X |
| 4,580,827 | 4/1986 | Feagan | 296/37.6 |
| 4,683,974 | 8/1987 | Richardson | 296/15 X |
| 4,936,624 | 6/1990 | West | 296/37.6 |
| 4,998,425 | 3/1991 | Hoogland | 70/159 |
| 5,083,829 | 1/1992 | Fonseca | 296/37.6 |
| 5,161,849 | 11/1992 | Holland, Jr. | 296/136 X |
| 5,235,830 | 8/1993 | Benge | 70/56 |
| 5,299,722 | 4/1994 | Cheney | 296/37.6 X |

*Primary Examiner*—Joseph D. Pape
*Attorney, Agent, or Firm*—R. J. Bunyard; L. A. Fillnow

[57] ABSTRACT

This invention relates to a storage container (26) having a security system for mounting within a bed (22) of a vehicle (20). The security system my be operated by a vehicle battery (34) and include an alarm system utilizing the safety equipment of the vehicle such as a horn (36) and a parking light (38). The container includes a lower portion (30) and an upper portion (28) containing a security system (64). Lower portion 30 includes a pair of spaced end walls (42) connected together by a pair of side walls (43). The security system includes an alarm including plunger switches (66, 68) connected to an alarm control module (70), a key operated entry lock (76) and a remotely operated solenoid lock release (78). Unless disarmed, the alarm becomes activated whenever the lid of the storage container is opened.

19 Claims, 6 Drawing Sheets

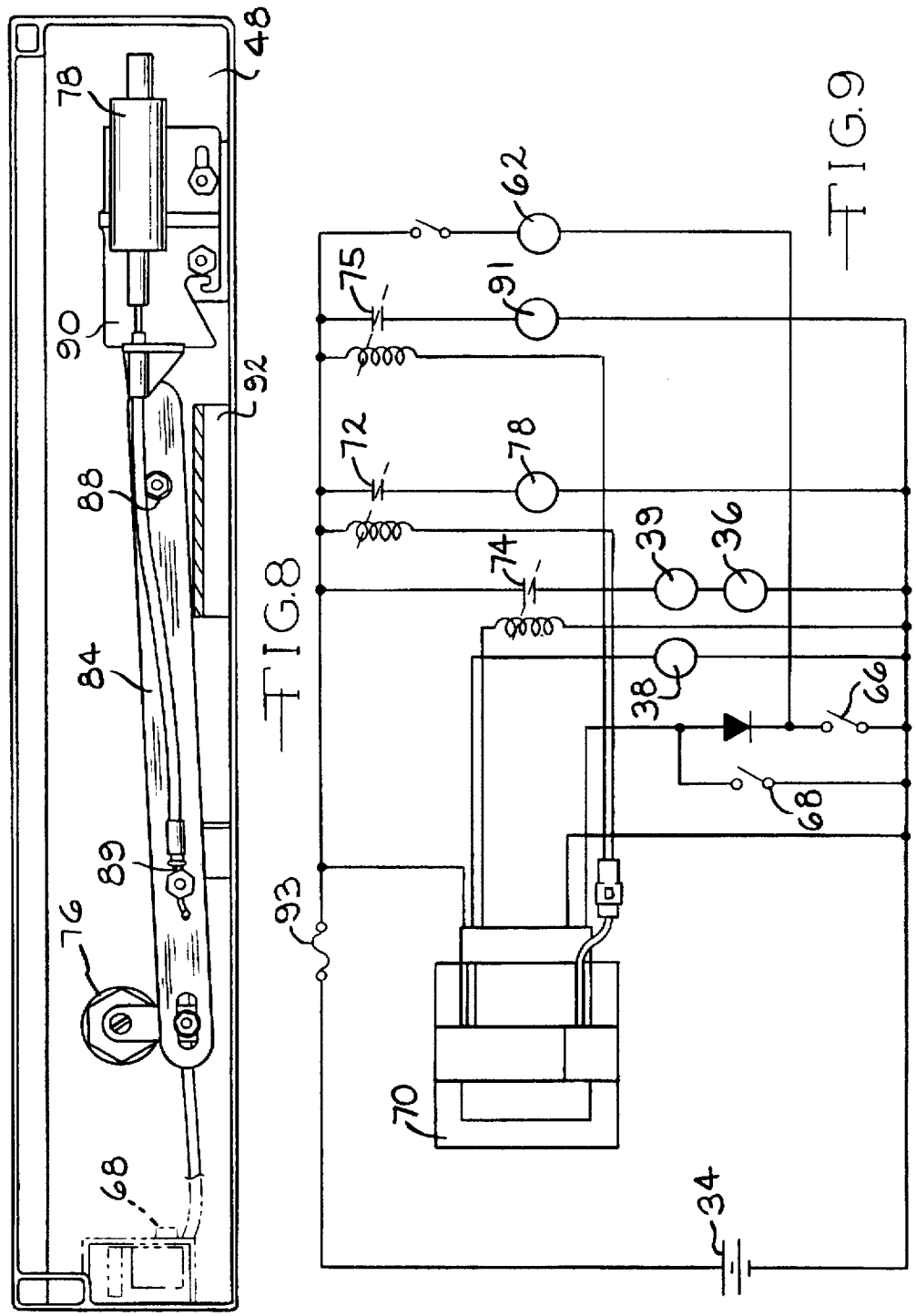

5,727,835

ALARMED TRUCK MOUNTED TOOL BOX

BACKGROUND OF THIS INVENTION

This invention relates to a storage container for mounting within the bed of a vehicle, such as a pick-up truck, for securing work tools and the like. More particularly, this invention relates to a security system for such a storage container.

It is common practice in the construction industry or industrial service trades for craftsmen to secure their work tools in a storage container mounted within the bed of a pick-up truck. Because of theft of tools from an unattended or unlocked storage container, it has become common practice to provide the container with a tumbler or padlock type locking device. These exposed locking devices pose little, if any, obstacle to an experienced thief. Other short comings of prior art storage containers is that they do not provide any deterrent for removal from the truck, no deterrent for damage to the container and no personal security for the operator of the truck.

In more recent years, it has become known to use an internally received lock for securing a storage container. This type of locking mechanism has only an exposed key hole and requires a forced entry. For example, U.S. Pat. No. 5,235,830 relates to a tool box transversely mounted within the bed of a pick-up truck. The box includes an internal localized recess extending inwardly from an externally accessible lock having only an exposed key hole. A padlock is provided within the internal recess for locking and unlocking the tool box. The box includes pivotally supported, spring biased latching members mounted inside a lid.

Nevertheless, there remains a need for a security system providing a deterrent against unauthorized entry into or removal of the storage container from the vehicle. There remains a need for an internally installed security system that will prevent a determined thief from making a forced entry into a storage container thereby preventing damage to the container. There remains a further need for a security system that deters a perpetrator from even considering forced entry, an attempted removal of a storage container from a vehicle or physically threatening the operator of the vehicle.

SUMMARY OF THIS INVENTION

This invention relates to a storage container mounted within the bed of a vehicle, such as a pick-up truck, for securing work tools and the like. More particularly, this invention relates to a security system mounted inside such the storage container.

An object of this invention is to provide a novel security system for a storage container providing a high level of deterrent against unauthorized entry. Another object of this invention is to provide a novel security system for a storage container against tampering and forced entry. Another object of this invention is for the security system of the storage container to include an alarm system operable from the battery of the host vehicle. Other objects of this invention is for the security device to include an alarm system that utilizes the safety equipment of the vehicle and provides a panic alarm to frighten off any potential threat to the storage container, the vehicle or the operator of the vehicle.

This invention relates to a storage container for mounting within the bed of a vehicle having a battery and a horn. The storage container includes a pair of end walls, a pair of side walls positioned between the end walls, a lid and a bottom for enclosing the walls, and a security system including an alarm connectable to the battery for providing a deterrent against unauthorized entry inside the container.

Another feature of the invention is for the aforesaid alarm to be audible.

Another feature of the invention is for the aforesaid audible alarm being the vehicle horn.

Another feature of the invention is for the aforesaid security system to include a lock.

Another feature of the invention is for the aforesaid security system to include a latch mounted on an inside surface of one of the walls, the latch for securing the lid to the one wall.

Another feature of the invention is for the aforesaid alarm to be visible.

Another feature of the invention is for the aforesaid visible alarm being the vehicle parking lights.

Another feature of the invention is for the aforesaid lock to be solenoid operated for remotely releasing the latch.

Another feature of the invention is for the aforesaid lock to be key operated for manually releasing the latch.

Another feature of the invention is for the aforesaid security system to include a panic means.

Another feature of the invention is for the aforesaid security system to include means for detecting unauthorized entry into the container.

Another feature of the invention is for the aforesaid detection means being a plunger switch.

Another feature of the invention is for the aforesaid locks to include a common linkage bar operated independently of each of the locks for releasing the latch.

An advantage of this invention is a security device that provides a high level of deterrent against unauthorized forced entry, minimization of tampering and damage. Another advantage of this invention is a security device alarm that does not require an auxiliary power source and utilizes the safety equipment of the vehicle. Other advantages include a security device having a remote entry locking device and provides a visible deterrent for tool box removal from the truck or potential physical threat to the operator of the vehicle.

The above and other objects, features and advantages of the invention will become apparent upon consideration of the detailed description and appended drawings.

DESCRIPTION OF THE DRAWINGS

FIG. 8 is the same as FIG. 6 with a keyless entry lock activated.

FIG. 9 is an illustration of the electrical wiring diagram of the security system of the invention and FIG. 10 is a perspective view of the vehicle of FIG. 1.

DETAILED DESCRIPTION OF THE PREFERRED EMBODIMENT

Figure 1:
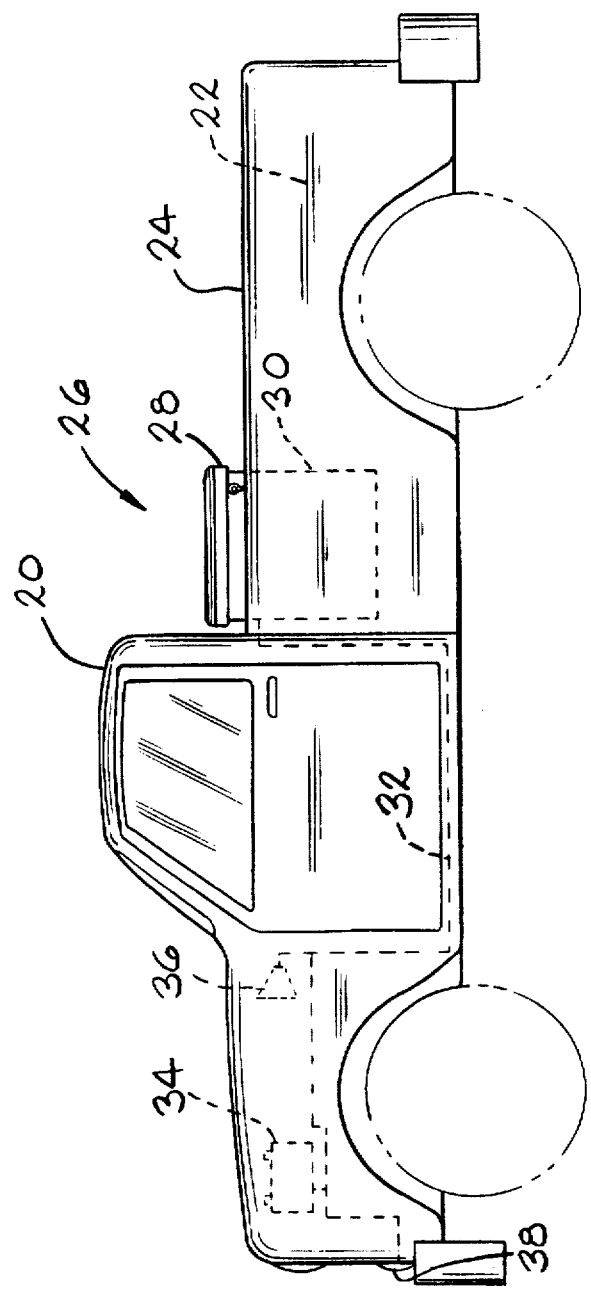
FIG. 1 is a side view of a storage container of the invention mounted within the bed of a vehicle.
Figure 10:
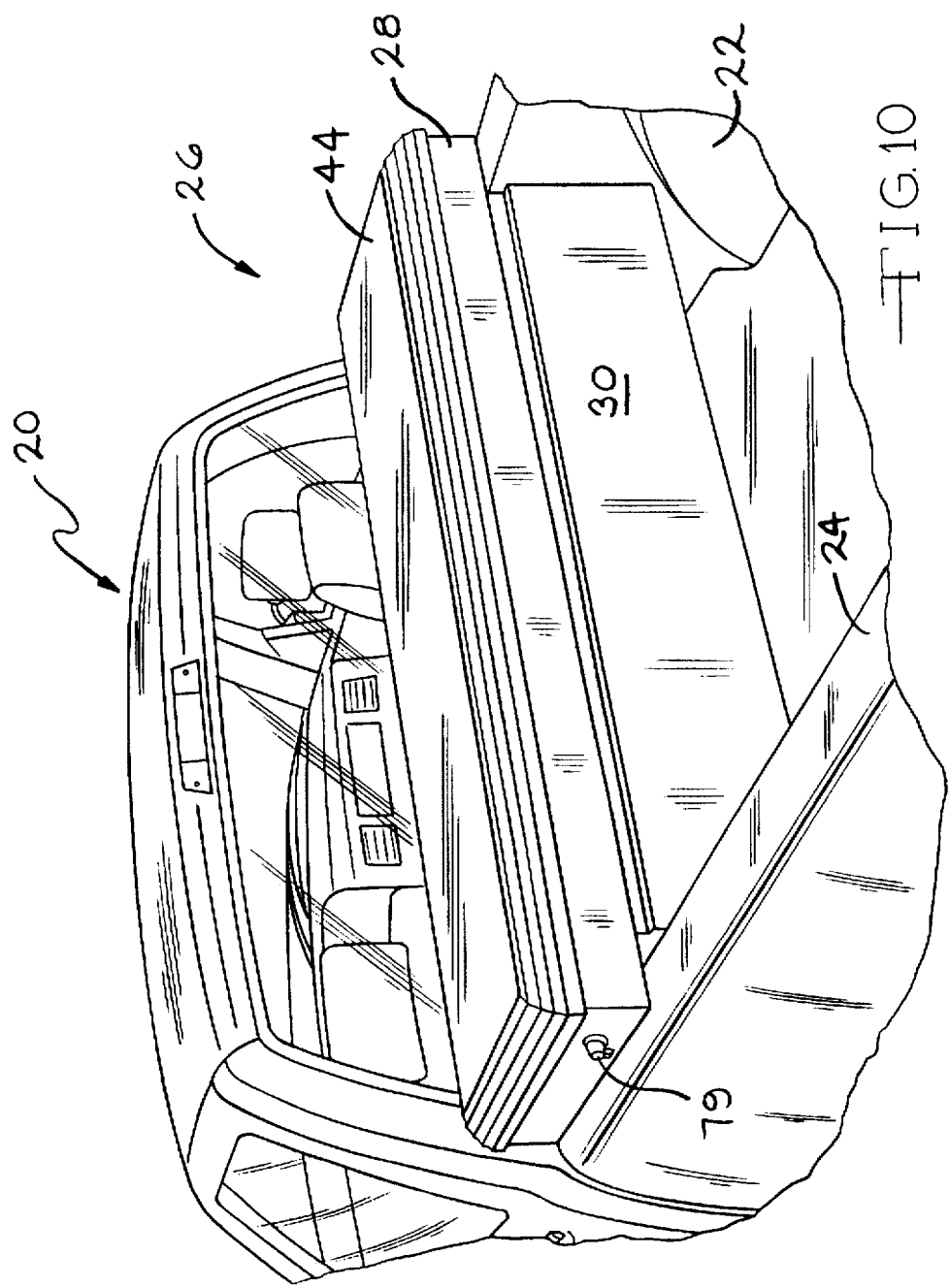

Referring to FIGS. 1 and 10, reference numeral 20 illustrates a vehicle such as a pick-up truck having a bed 22 and an upper surface 24 for supporting a storage container 26 such as a tool box containing a security system of the invention. Storage container 26 may include an upper portion 28 and a lower portion 30. The security system preferably is operated through wiring 32 including a fuse 93 connected to a battery 34 mounted under the hood of the vehicle and includes an alarm system utilizing the standard safety equipment of the vehicle such as one or more of a horn 36 and parking lights 38.

Figure 2:
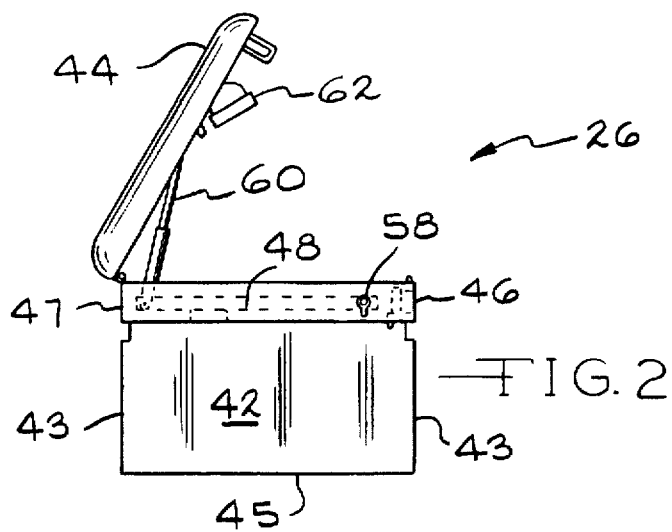
FIG. 2 is a side view of the storage container of FIG. 1 illustrating the lid in the raised or open position.
Figure 3:
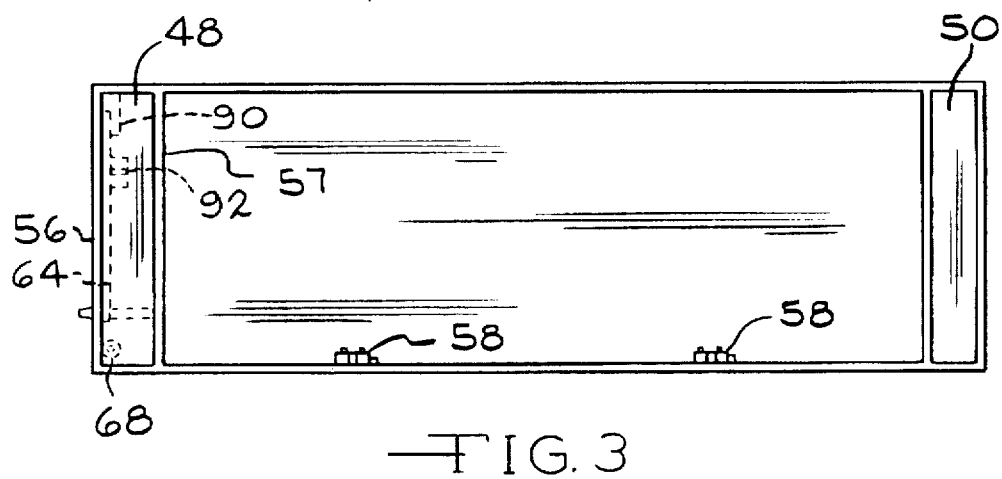
FIG. 3 is a plan view of the of the storage container of FIG. 2 with the lid removed.
Figure 4:
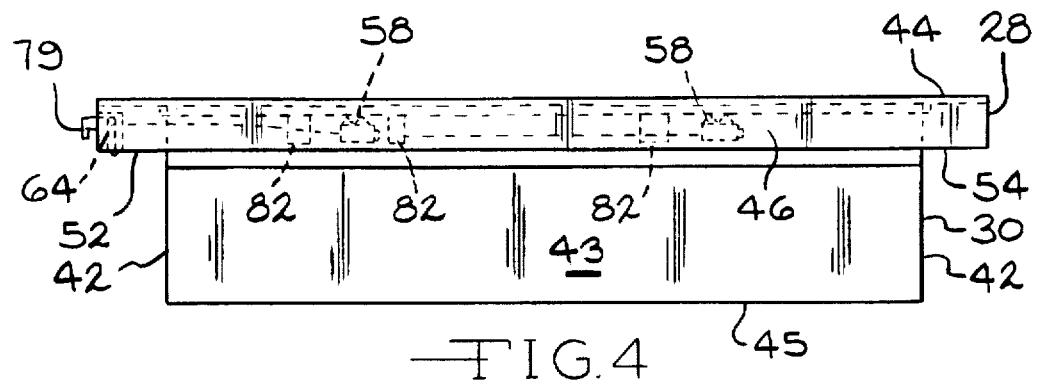
FIG. 4 is an elevation view of the storage container of FIG. 2 with the lid closed.

FIGS. 2–4 illustrate one embodiment of the invention of FIG. 1. Lower portion 30 of storage container 26 includes a pair of spaced end walls 42 connected together by a pair of side walls 43. Upper portion 28 of storage container 26 includes a pair of end compartments 48 and 50 with the security system of the invention being located in one of these compartments. In the embodiment illustrated, the security system is stored in compartment 48. Each compartment 48 and 50 of the storage container includes an underside or shoulder 52 and 54 respectively for resting on upper surface 24 of vehicle bed 22 for suspending the storage container. The storage container is enclosed by an upper lid 44 and a lower bottom 45. Lid 44 is mounted near an upper edge of one of the walls such as being pivotally connected or hinged to a rear side wall 47 of upper portion 28. Lid 44 preferably is supported by a gas cylinder 60. In the embodiment illustrated, the underside of lid 44 includes a flood light 62. The lid is secured by one or more clasps for being coupled to latches 58 mounted onto an inside surface of a front side wall 46 of lower portion 30. It will be understood the storage container also could include a pair of lids. In this situation, each of the lids may be mounted for rotation near the middle portion of the upper portion 28. The storage container would be divided into two equals portions by a wall positioned within the middle of the container and extending parallel to the length of the vehicle.

Figure 5:
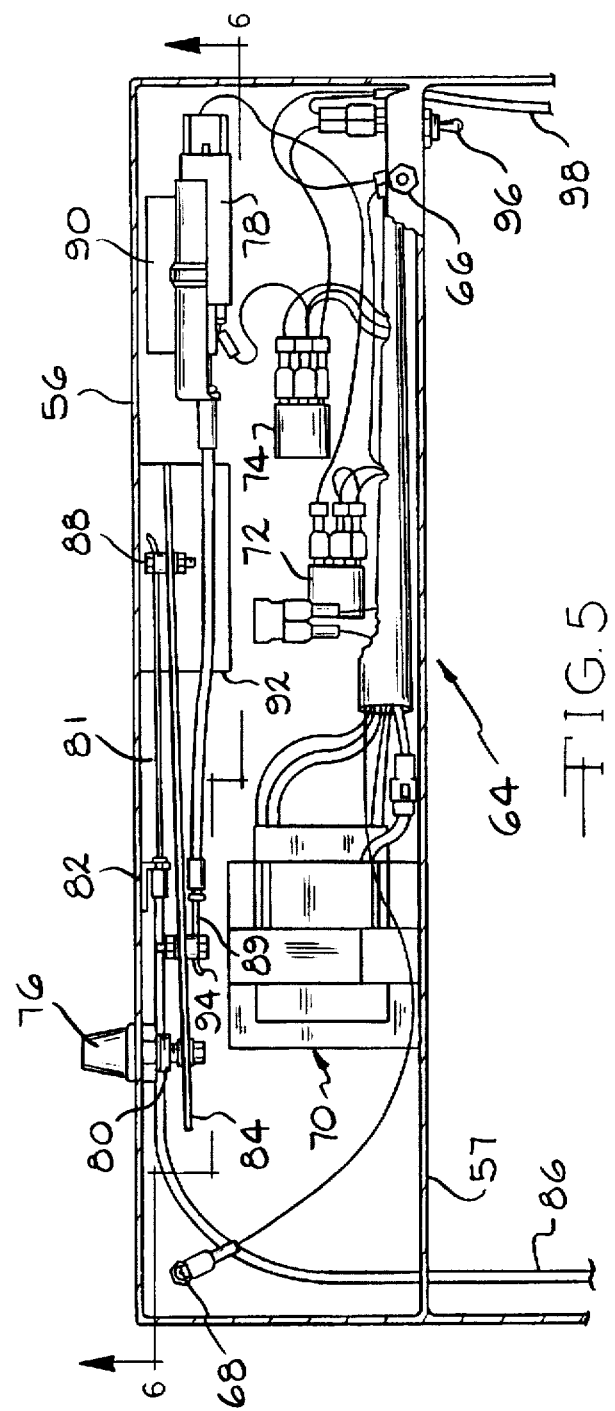
FIG. 5 is an enlarged plan view of the compartment containing the security system of the invention of FIG. 3.

FIG. 5 illustrates one embodiment of a security system 64 of this invention mounted within compartment 48. One of the unique features of this invention is security system 64 including an alarm system that provides a effective deterrent against unauthorized entry into storage container 26. An experienced thief is unlikely to make a forced entry into the storage container knowingly if his action will trigger a loud sounding alarm in a public area. The alarm system may include means for detecting an unauthorized entry into the container such as one or more plunger switches 66 and 68 connected to an alarm control module. The control module is connected to a visual and preferably an audible means capable of interrupting a forced entry by a thief. Such an audible means might be the vehicle horn or a high frequency auxiliary installed siren. Additionally, the parking lights of the vehicle could be utilized as a visual alarm as well. Plunger switches 66 and 68 are connected through the alarm control module and a relay 74 to horn 36 of the vehicle. The alarm control module and additional relays could be utilized if additional alarms are desired.

In a preferred embodiment, the security system of this invention includes an entry lock. The embodiment of FIG. 5 includes a manual or keyed tumbler type lock 76 as well as a keyless lock release remotely operated by a solenoid 78. Lock 76 includes a finger lever 79, a key lock arm 80, a cable bracket 82 for supporting a cable conduit 86, a cable 81 and a cable stop 88. Solenoid operated lock release 78 includes an operation cable 89, a support bracket 90, a linkage bar guide 92 and a cable stop 94. A linkage bar 84 is common for lock 76 and lock release 78. The purpose of bar guide 92 is to keep linkage bar 84, in alignment with key lock arm 80, solenoid lock release 78, and cable 81.

It is desirable for flood light 62 to be operable anytime the lid of the storage container is opened. If the operator opens the storage container and there already is sufficient light, the flood light may be disabled by a toggle switch 96 connected to the vehicle battery through a wiring harness 98.

Figure 6:
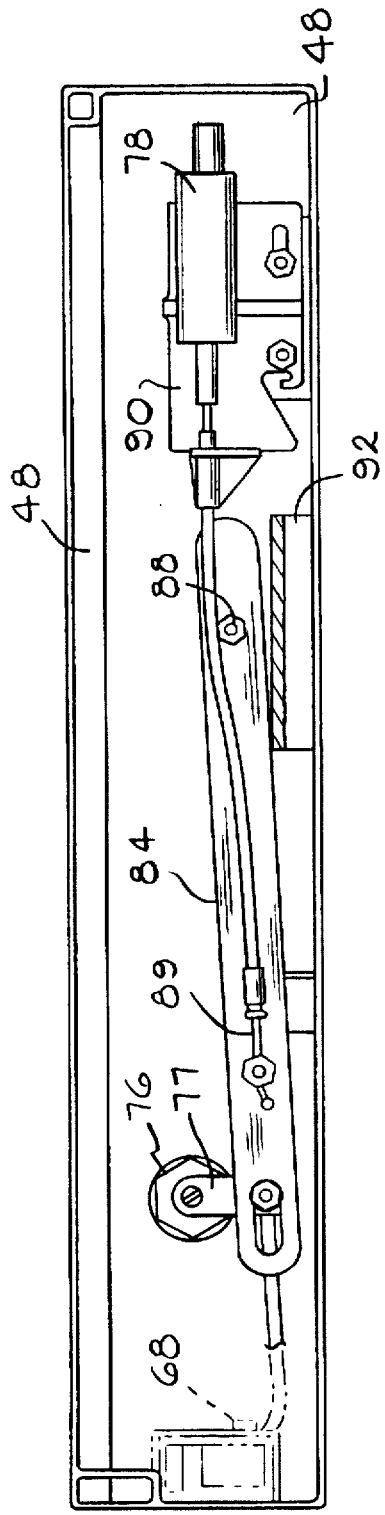
FIG. 6 is a cross section along line 6—6 of FIG. 5.

FIG. 6 is a cross section view taken along line 6—6 of FIG. 5 of the locking mechanisms. In this view, lock 76 and lock release 78 are in a rest or locked position.

Figure 7:
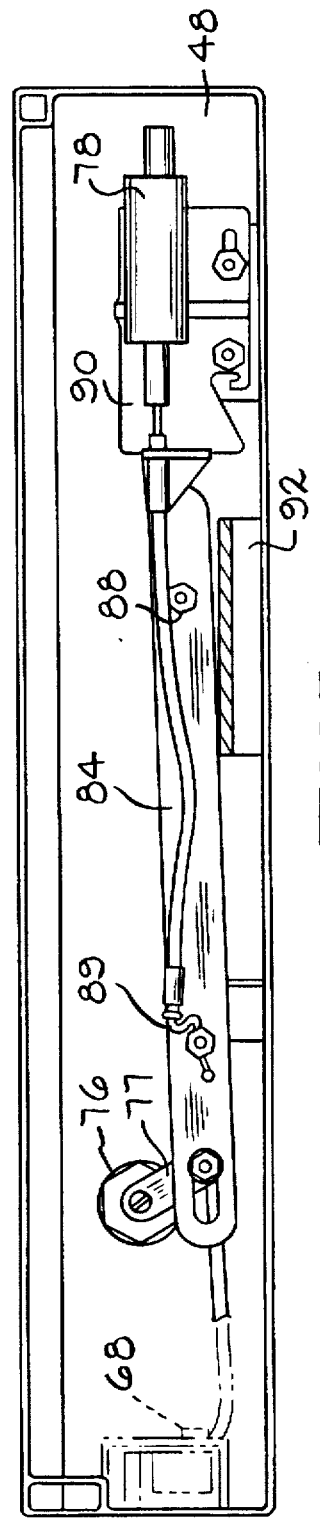
FIG. 7 is the same as FIG. 6 with a manual key entry lock activated.

Operation of key lock 76 of the invention now will be described. FIG. 7 illustrates key lock 76 activated by the operator of the vehicle after inserting a key into the lock. With finger lever 79 in an unlocked position, the lever is rotated in a clockwise direction until the lid becomes raised automatically by gas cylinder 60. A crank 77 of key lock 76 has been rotated slightly to the right or counter clockwise as viewed in FIG. 7 relative to its position illustrated in FIG. 6. Linkage 84 also has been shifted to the right (note slack cable 89 in FIG. 7). This shifting of linkage causes cable 81 (FIG. 5) to become pulled through conduit 86 thereby releasing latches 58.

After the operator is finished using the storage container, lid 44 is locked manually when the operator closes and holds the lid shut until latch 58 mounted on front side wall 46 is engaged with the clasps of the lid. The alarm of this invention will be armed automatically when the lid of the storage container is closed by the operator after a predetermined period of time when a plunger switch is depressed when contacted by the underside of the lid. Plunger switch 66 becomes activated whenever lid 44 is raised as the result of an authorized entry through operation of either of locks 76 or 78. Raising of lid 44 causes the circuit to be closed when the plunger switch is allowed to rise.

Alternatively, the alarm may be armed by manual operation of a remote control. The remote control is a type that includes a pair of buttons. A first button is for activating the alarm and a second button is for operating the keyless lock release. With the lid in a closed position, depressing the first button causes the vehicle horn to chip once and the parking lights to flash once. This horn sounding and light flash indicates the alarm is armed. The alarm includes a predetermined ten second delay, before it functions thereby allowing the electronics of the system to stabilize.

The alarm of the invention may be disarmed by manual operation of the remote control by again pressing the first button. This time the vehicle horn preferably chips twice and the parking lights flash twice indicating the alarm is disarmed and that tampering has not occured to the storage container. If the vehicle horn chips three times and the parking lights flash three times, this is an indication tampering has occured to the storage container.

Operation of key lock 76 of the invention was described above. Operation of the solenoid operated keyless lock release of the invention now will be described. Before raising the lid, the operator disarms the alarm as described above, i.e., pressing the first button on the remote control. With the lid in a closed position, the operator now presses and holds for a predetermined amount of time, such as three seconds, the second button on the remote control. The latch will be released and the lid will be raised by the gas cylinder. This is illustrated in FIG. 8 with cable 89 being pulled to the right by lock release 78 causing linkage 84 also to be shifted to the right. This shifting of linkage causes cable 81 to become pulled through conduit 86 thereby releasing latches 58 in a manner similar to that described above for operating key lock 76. Keyless lock release 78 will open the storage container regardless of whether finger lever 79 is in the locked or the unlocked position. The remote control can not be used to lock the storage container.

FIG. 9 illustrates an electrical wiring for one embodiment of the security system of the invention. It may be desirable to include an alarm system having a plurality of relays. In the embodiment illustrated, the alarm includes a third relay 75 and an added flasher light 39. In the situation wherein the storage container includes a pair of lids mounted for rotation near the middle portion of the upper portion, each lid may be operated by solenoid lock release. This embodiment includes solenoid lock release 78 for one lid and a second solenoid lock release 79 and its corresponding optional relay 75 for the second lid.

The alarm, when in an armed condition, will become triggered whenever entry into the storage container occurs by any means. When the alarm is armed, the alarm must be disarmed prior to even an authorized entry with a key or by a remote control. For example, if the operator opens the storage container using the remote control but inadvertently forgot to disarm the alarm, i.e., pressing the first button on the remote control, the horn will begin sounding and the lights begin flashing. The operator can still disarm the alarm, however, at this time by pressing the first button one time as previously described.

The alarm system of this invention may also include a panic feature wherein the operator may sound the vehicle horn or flash the vehicle parking lights in an emergency situation whenever he feels threatened by a perpetrator. The panic feature includes the security system having a built in ability by being activated by pressing and holding button one of the remote control for a predetermined amount of time, e.g., three seconds. The panic feature can be activated at any time regardless of whether the alarm system is armed or disarmed. Activating the panic feature when the alarm is disarmed causes the alarm system to become armed. The panic feature subsequently can be deactivated by pressing and holding the same button again after the threatening situation no longer exists. If the panic feature is deactivated while the alarm is armed, the alarm will be disarmed.

It will be understood various modifications may be made to this invention without departing from the spirit and scope of it. Therefore, the limits of this invention should be determined from the appended claims.

What is claimed is:

1. A storage container for mounting within the bed of a vehicle having a battery and a horn, comprising:

the container defined by a pair of end walls, a pair of side walls positioned between the end walls, a lid and a bottom for enclosing the walls and including a security system mounted inside the container for providing a deterrent against unauthorized entry, the security system including an alarm connectable to the battery.

2. The container of claim 1 wherein the alarm is audible.
3. The container of claim 2 wherein the alarm is the vehicle horn.
4. The container of claim 1 wherein the alarm is visible.
5. The container of claim 4 wherein the alarm is a parking light of the vehicle.

6. The container of claim 1 including a flood light mounted to the underside of the lid and operated by the vehicle battery.
7. The container of claim 1 wherein the security system includes a latch mounted on an inside surface of one of the side walls of the container, the latch for securing the lid to the side wall.

8. The container of claim 7 wherein the security system includes a key operated lock for manually releasing the latch.
9. The container of claim 8 wherein the lock includes a finger lever.
10. The container of claim 7 wherein the security system includes a solenoid operated lock release for remotely opening the latch.
11. The container of claim 7 wherein the security system includes a key operated lock and a solenoid operated lock release.
12. The container of claim 1 wherein the security system includes means for detecting unauthorized entry into the container.
13. The container of claim 1 wherein the security system includes a plunger switch for detecting unauthorized entry into the container.
14. The container of claim 1 wherein the security system includes a key operated lock and a solenoid operated lock release, the locks including a common linkage bar operated independently of the lock and the lock release.

15. The container of claim 1 wherein the security system includes a panic feature.
16. The container of claim 15 wherein the panic feature includes sounding of the horn.
17. The container of claim 1 wherein the lid is pivotally connected to one of the side walls.
18. A storage container for mounting within the bed of a vehicle having a battery, a horn and parking lights, comprising:

the container defined by a pair of end walls, a pair of side walls positioned between the end walls, a lid and a bottom for enclosing the walls and a security system mounted inside the container, the lid pivotally mounted to one of the side walls, the security system including means for detecting unauthorized entry connectable to the vehicle battery for sounding of the horn and flashing of the parking lights thereby providing a deterrent against unauthorized entry into the container.

19. A storage container for mounting within the bed of a vehicle having a battery, a horn and parking lights, comprising:

the container including an upper portion and a lower portion, each of the portions being defined by a pair of end walls, a pair of side walls positioned between the end walls, a lid for enclosing the walls of the upper portion, a bottom for enclosing the walls of the lower portion and a security system mounted inside the container, the lid pivotally mounted to one of the side walls, the security system including a lock and means for detecting unauthorized entry, the detecting means connectable to the vehicle battery for sounding of the horn and flashing of the parking lights thereby providing a deterrent against unauthorized entry into the container.

* * * * *